United States Patent [19]

Parker

[11] 4,055,500

[45] Oct. 25, 1977

[54] FILTERING APPARATUS AND QUICK-OPENING BACKWASH VALVE THEREFOR

[76] Inventor: Leland L. Parker, 1018 W. Ontario St., Corona, Calif. 91720

[21] Appl. No.: 656,939

[22] Filed: Feb. 10, 1976

[51] Int. Cl.² .............................................. B01D 29/38
[52] U.S. Cl. .................................... 210/412; 210/425; 251/76
[58] Field of Search ................ 210/108, 277, 278, 412, 210/411, 410, 425; 251/76; 137/238, 492.5, 315

[56] References Cited

U.S. PATENT DOCUMENTS

| 582,402 | 5/1897 | Stifel .................................. 210/425 X |
| 1,256,766 | 2/1918 | Behrendt et al. ................. 210/410 X |
| 2,039,099 | 4/1936 | Mastenbrook ................. 137/492.5 X |
| 2,338,417 | 1/1944 | Forrest et al. ......................... 210/412 |
| 2,728,547 | 12/1955 | Crookston et al. ............ 137/492.5 X |
| 3,025,871 | 3/1962 | Roth et al. ............................ 137/238 |
| 3,380,590 | 4/1968 | Grayson ........................... 210/278 X |
| 3,540,690 | 11/1970 | Brown ............................... 137/492.5 |

Primary Examiner—John Adee

[57] ABSTRACT

Filtering apparatus in which a fluid filter has a filtering flow passage with an inlet end connected to an inlet control valve, and an outlet end connected with an outlet control valve, said filter having a fluid storage reservoir in communication with the outlet end of the flow passage so that by closing the outlet valve and opening the inlet valve clean filtered fluid may be forced into the reservoir in a manner to compress the entrapped air and provide a supply of pressurized clean filtered fluid for use in a backwashing reverse flow operation through the filtering flow passage, during which the inlet and outlet valves are both closed.

The backwash flow is controlled by a unique quick-opening backwash poppet valve which is so connected with the flow passage that the fluid pressure of the backwashing fluid will act to normally urge the backwash valve to a closed position which prevents the reverse flow until the backwash poppet valve is opened.

A unique feature of the backwash valve resides in the provision of actuating means for quickly opening the backwash valve in a manner to produce an explosive-like surge in the backwashing flow in order to more effectively dislodge accumulated filtered media in the filter.

In one form, the backwash valve embodies manually operable means for applying an impact valve opening force; and in another form the valve opening force is applied by means of a pressurized fluid actuator in combination with spring means.

25 Claims, 7 Drawing Figures

FILTERING APPARATUS AND QUICK-OPENING BACKWASH VALVE THEREFOR

PRIOR ART

In the prior art there are numerous examples of valve structures which embody actuators which employ an impacting member to open the valve, and which employ pneumatic or hydraulic power actuators for operating the valve. The closest art known to applicant are the following patents:

a. Impacting member type:
U.S. Pat. Nos. 1,596,968 — Aug. 24, 1926
1,854,605 — Apr. 19, 1932
3,770,241 — Nov. 6, 1973 b. Pneumatic and hydraulic actuator type:
U.S. Pat. Nos. 3,025,871 — Mar. 20, 1962
3,623,509 — Nov. 30, 1971
3,865,132 — Feb. 11, 1975
3,884,251 — May 20, 1975

BACKGROUND OF THE INVENTION

The present invention relates generally to fluid filtering apparatus which are arranged to be cleaned by a reversed backwashing flow.

Heretofore, it has been generally known to provide filtering apparatus in which the filter unit is arranged to be connected for normal filtering flow of the fluid to be filtered in one direction through the filter, and periodically reverse the direction of flow through the filter to remove the accumulated filtered out media. In many installations, the reverse flow or backwashing procedure, as previously practiced, is not entirely satisfactory for the reason that much of the filtered out media becomes lodged in the filter and is not effectively removed by the usual reverse flow or backwashing process.

In the development of the filter apparatus of the present invention it was found that the backwashing procedure could be greatly improved by providing some means by which the backwashing flow could be initiated with an explosive-like surge which could be relied upon to effectively loosen and remove the embedded filtered out media. Moreover, further investigation indicated that such an explosive-like surge could be obtained by the utilization of a backwashing valve of large capacity which could be quickly opened by an inertial or other type of operator which could quickly move the valve to a full open position.

While the prior art discloses valve structures generally which utilize an impacting member for applying an impact force to open the valve, or arrangements which utilize pneumatic and hydraulic actuators, the prior art patents have not envisioned the concept of using the quick-acting valve in a filter backwashing arrangement.

The Hansen et al U.S. Pat. No. 1,596,968, issued Aug. 24, 1926 discloses a magnetically operated valve wherein a magnet is energized to actuate a toggle linkage which causes downward movement of a hammer in order to impart an impact force to a spring-loaded, normally closed valve.

The Tratsch U.S. Pat. No. 1,854,605, issued Apr. 19, 1932 discloses an air gun in which a hammer head is moved to compress a spring by pulling of a trigger rearwardly, and upon release of the hammer to forcibly strike the stem of the air valve so as to momentarily unseat the valve and permit a flow of pressurized air to propel the projectile.

It has also been known from the Allen U.S. Pat. No. 3,770,241, issued Nov. 6, 1973 to provide a hand actuated springbiased impacting member arranged for imparting motion to a transfer member, and subsequently to a one-way clutch means which rotates a closure member or valve element.

Pneumatic and hydraulic valve opeators are known generally, and as indicated by the Knight U.S. Pat. No. 3,884,251, issued May 20, 1975, it has been previously known to utilize a valve having a valve stem telescopically connected to a pneumatic or hydraulic power actuator.

The prior art disclosures as noted above are lacking in the essential features which are incorporated in the unique filtering apparatus and backwash valve of the present invention to produce a quick opening valve action which will result in the production of an explosive-like surge upon the initiation of the backwashing flow, and which will effectively dislodge the embedded filtered out media.

SUMMARY OF THE INVENTION

The present invention relates generally to filtering apparatus, and is more particularly concerned with a unique backwash valve of the quick opening type to produce an explosive-like surge in the backwashing flow of the filter upon the initiation of such flow, and in a unique filtering arrangement which permits the utilization of pressurized filtered fluid for the backwashing operation.

It is one object of the herein described invention to provide an improved and unique fluid filtering apparatus having backwashing means which utilizes the clean filtered fluid produced thereby.

It is a further object to provide filtering apparatus according to the preceding object, which embodies a fluid storage reservoir or chamber, and which has control valves that are operable to effect charging of the reservoir with filtered clean fluid in a manner to provide a source of pressurized fluid for use in a backwashing operation.

A further object is to provide filtering apparatus in which clean filtered fluid is utilized for the backwashing operation, and which embodies a quick opening, large capacity, backwash valve for producing a high-explosive initial surge of the backwash flow in order to more effectively dislodge the filtered out media in the filter.

A still further object is to provide a unique quick opening backwash valve of simple and relatively inexpensive construction, which has operating characteristics particularly adapting it for use with filters that are arranged to be cleaned by means of a reversed fluid backflow.

Another object is to provide an improved backwash flow valve which is quickly operable to an open position by means of a manually actuated impacting member.

Still another object is to provide a quick opening backwash valve which utilizes a fluid pressure responsive actuator in combination with a compression spring, to sequentially first compress the spring, thereafter establish a direct connection with the valve and move it to an initial unseated position, and whereupon the compressed spring may function to quickly open the valve in a manner to provide an explosive-like surge flow therethrough.

Further objects and advantages of the invention will be brought out in the following part of the specification, wherein detailed description is for the purpose of fully disclosing several embodiments of the invention without placing limitations thereon.

BRIEF DESCRIPTION OF THE DRAWINGS

Referring to the accompanying drawings, which are for illustrative purposes only.

DESCRIPTION OF THE SEVERAL EMBODIMENTS

Figure 1:
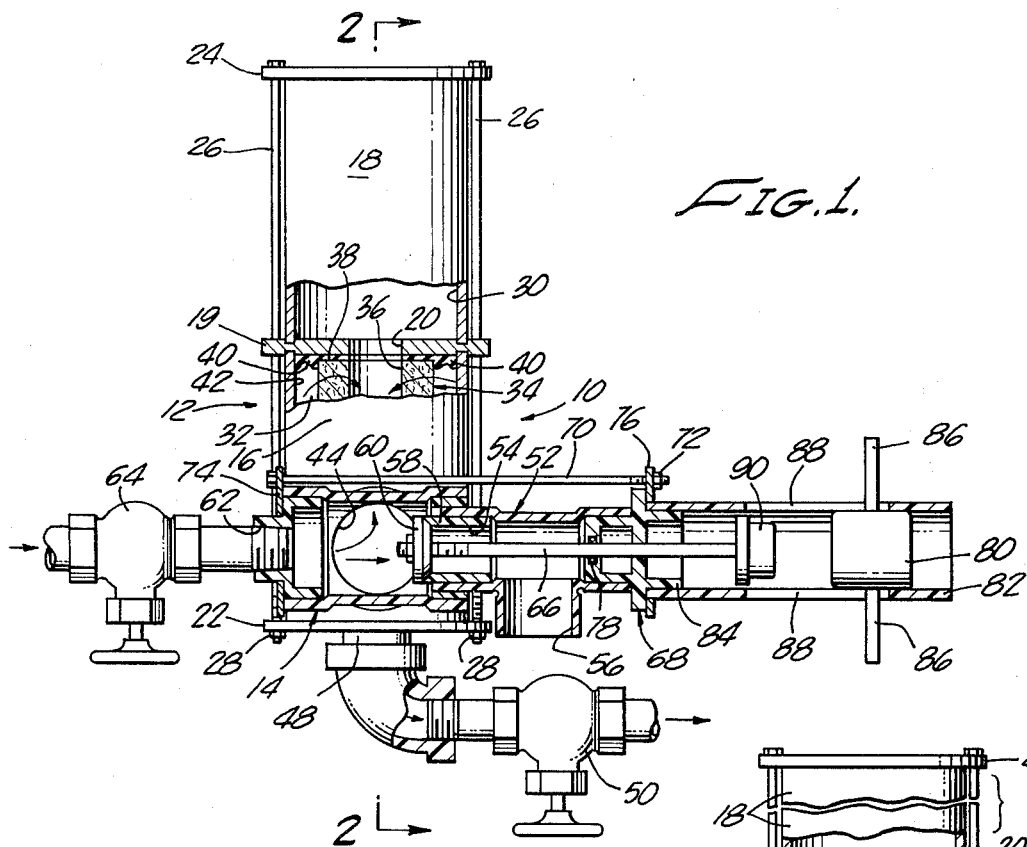
FIG. 1 is a side elevational view of filtering apparatus according to the present invention, portions being cut away to disclose the operative relationship of the fluid storage reservoir and the filtering components, and other portions being in section to disclose the component parts of the manually actuated backwash valve, the valve being in closed position.
Figure 2:
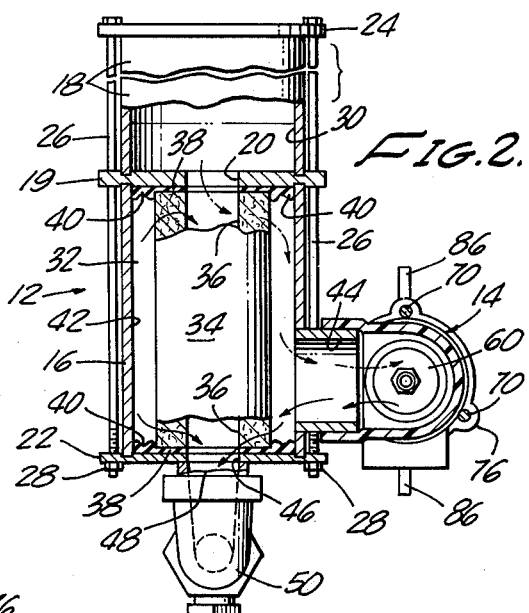
FIG. 2 is a transverse sectional view taken substantially on line 2-2 of FIG. 1, and illustrating the respective flow paths of the pressurized fluid during a filtering operation, and during a backwash reverse flow cleaning operation.

Referring more specifically to the drawings, for illustrative purposes, the invention is shown in FIG. 1 as comprising filtering apparatus, as generally indicated at 10, and being composed of a filtering unit 12 and a backwash valve unit 14, which are assembled and interconnected into a compact operative assemblage. The filter unit and backwash valve unit may be constructed of any suitable materials such as metal or plastic, and may be interconnected by various means and may assume various configurations, and are not to be limited to the particular materials, connection means, or configuration as illustrated herein.

More specifically, the filter unit is shown as comprising a lower cylindrical housing 16 and an axially aligned upper cylindrical housing 18. These housings have their inner adjacent ends closed by a common separating wall 19 having a central communicating opening 20. The lower end of the housing 16 is closed by an end wall 22, and the upper end of the housing 18 is closed by an end wall 24. A plurality of tie bolts 26 extend through the peripheries of the walls, these tie bolts being threaded to receive appropriate holding nuts 28. As thus arranged, the housing 18 forms a closed reservoir or chamber, except for the communicating opening 20. The housing 16 forms a filter chamber 32 arranged to house an appropriate filter cartridge 34.

The filter cartridge 34 is fabricated from suitable filtering material and shaped to provide an elongated tubular structure having an axial bore 36 extending between its ends. The respective ends of the filter cartridge are sealed with respect to their adjacent wall structures by means of appropriate annular sealing disks 38 which are provided in each case with a circumferentially extending grooved sealing flange 40 which overlaps the associated end of the cartridge and extends into an annular space 42 which extends between the inner surface of the housing 16 and the outer surface of the filter cartridge 34. The annular space 42 is in communication with a flow port 44 which constitutes the inlet for fluid to be filtered. The axial bore 36 of the cartridge has its uppermost end in communication with the chamber 30 through the opening 20, and the lowermost end of the bore 36 is in communication by means of a central opening 46 of the end wall 22 with a connection 48 which constitutes the filter outlet. This filter outlet leads to and is connected with an outlet control valve 50.

The backwash valve unit 14 is supported on one side of the filter unit and comprises generally a T-shaped body 52 fabricated of metal, plastic, or other suitable material. This body is internally provided with a flow passage 54 which extends between the flow port 44 and a discharge port 56, the flow passage being formed between the flow port 44 and discharge port 56 with a valve seat 58 for operative cooperation with a poppet valve member 60 to control fluid flow in the flow passage between the flow port 44 and discharge port 56. The portion of the flow passage containing the valve 60 is further provided with a fluid inlet port 62 which is connected with a fluid inlet control valve 64 for controlling the admission of pressurized fluid to the flow port 44 into the filter. The admitted pressurized fluid will act on the valve member 60 and urge it into a seated position against the valve seat 58 during a normal filtering operation in which the fluid will pass radially inwardly through the filter cartridge from the annular space 42 into the axial bore 36 and then downwardly through the outlet connection 48 and the valve 50.

The valve member 60 is mounted on one end of a valve stem 66 which extends through the valve seat 58 and is supported for reciprocable movements in a wall member 68 which is retained in assembled relation with the other components of the valve body by means of a plurality of tie bolts 70 and associated nuts 72, the tie bolts extending between body retaining clamping rings 74 and 76. The outermost end of the stem 66 projects beyond the wall member 68 and is appropriately sealed with respect to the flow passage of the valve body by a sealing ring 78.

Figure 3:
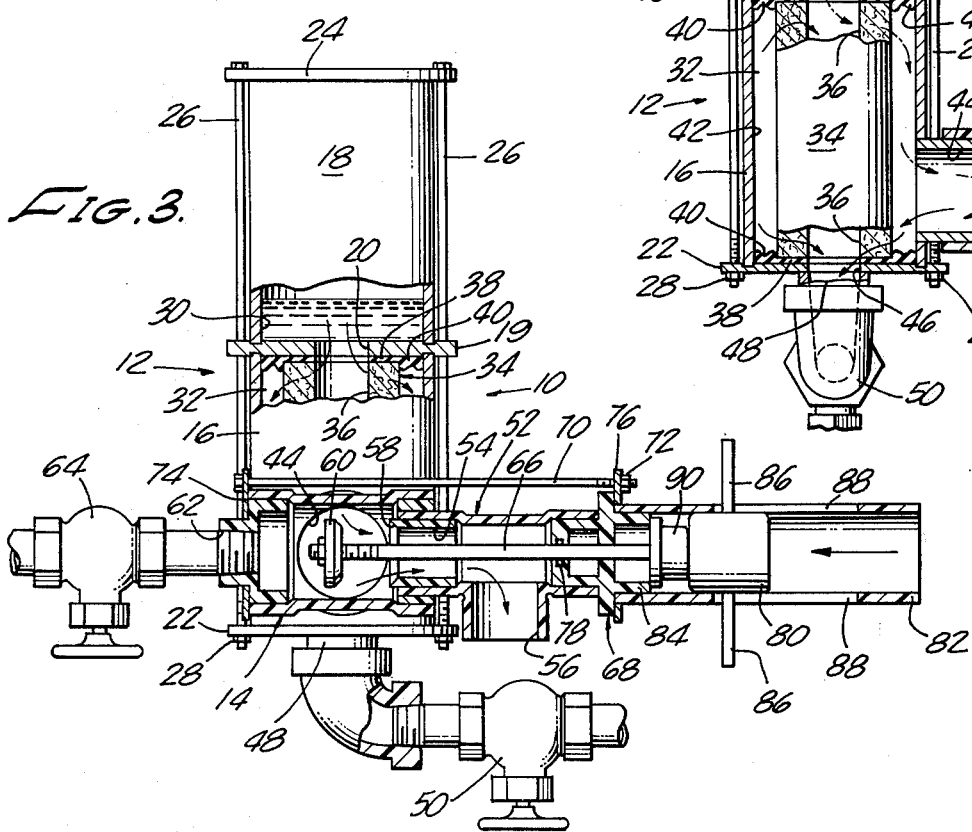
FIG. 3 is a view similar to FIG. 1, but illustrating the manual operation of the impacting member and the resulting movement of the valve to an open position for initiating reverse fluid flow through the filter for carrying out the backwash operation.

In the filtering apparatus as disclosed in FIGS. 1 and 3, the backwash valve unit is arranged to be operated by means of an actuator of the inertia type, and which will operate in a manner to quickly move the valve member 60 from a seated position to an open position with such speed that the pressurized fluid will flow from the inlet side of the valve to the discharge side with an explosive-like surge which is utilized in the present invention to dislodge the entrapped filtered out media during a backwashing operation, as will be more fully explained subsequently.

More specifically, the above mentioned actuator is illustrated as comprising a generally cylindrical mass 80 that constitutes an impact member which is supported for axial movements within a tubular guide member 82, the guide member being supported in coaxial relationship to the stem 66 by slip fit connection of its inner end over an annular projecting flange 84 formed on the wall member 68. The impacting member 80 is guidingly supported in its movement by a pair of oppositely extending handles 86 which project through elongate guiding slots 88 in which the handles are laterally movable. The projecting outermost end of the stem 66 is formed with a head portion 90, preferably of an elastomeric material, this head portion being so spaced with respect to the valve member 60 that when the valve is moved to open position, the extent of such movement will be limited by the peripheral engagement of the head portion with the outer end edge of the annular flange 84 which thus functions as an abutment stop.

When it is desired to move the valve 60 from a closed position as shown in FIG. 1, to an open position as shown in FIG. 3, it is only necessary to manually grasp the handles 86 and by a quick movement of the impacting member 80, bring it into engagement with the head portion 90. This sudden impact force will quickly move the valve 60 from its seated position to a fully opened position as limited by the engagement of the head portion 90 with the abutment stop formed by the annular flange 84. Advantage is taken of this quick opening characteristic in effecting the backwashing operation of the filter, as will now be explained.

Considering that the filter is in normal operation, the valves 50 and 64 will both be open. When it is desired to initiate a backwashing operation, the valve 50 will first be closed to cut off the filter outlet. By maintaining the inlet valve 64 in open position, clean filtered fluid will then be forced upwardly through the opening 20 into the chamber 30, and as the fluid level rises in this chamber the entrapped air will be compressed until the air pressure in the chamber is equal to the pressure of the inlet fluid. The valve 64 is then closed, and further flow within the filter unit will be held in abeyance.

The backwash operation may now be initiated by forcefully moving the impacting member 80 into engagement with the head portion 90, whereupon the inertial impact forces will quickly displace the valve 60 from its seated position to a fully open position so as to allow large capacity flow from the flow port 44 past the valve and out of the discharge port 56. This action produces an explosive-like reverse surge of clean filtered fluid from the chamber 30, and this sudden surge will very effectively remove the lodged filtered media from the filter cartridge and carry it along with the discharge fluid to the discharge port 56. The path of reverse flow is indicated by the phantom flow arrows.

Figure 4:
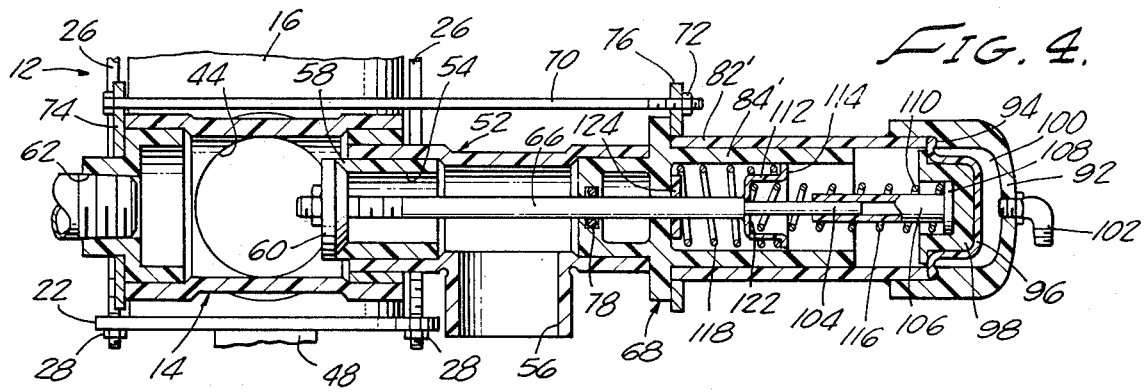
FIG. 4 is an enlarged fragmentary side view, similar to FIG. 1 but primarily being a longitudinal section to show the cooperative relationship of the backwash valve of FIG. 1 arranged to be operated by means of a pressurized fluid actuator, and which is shown in its normal deenergized condition wherein an associated primary compression spring is in a normally expanded state.
Figure 5:
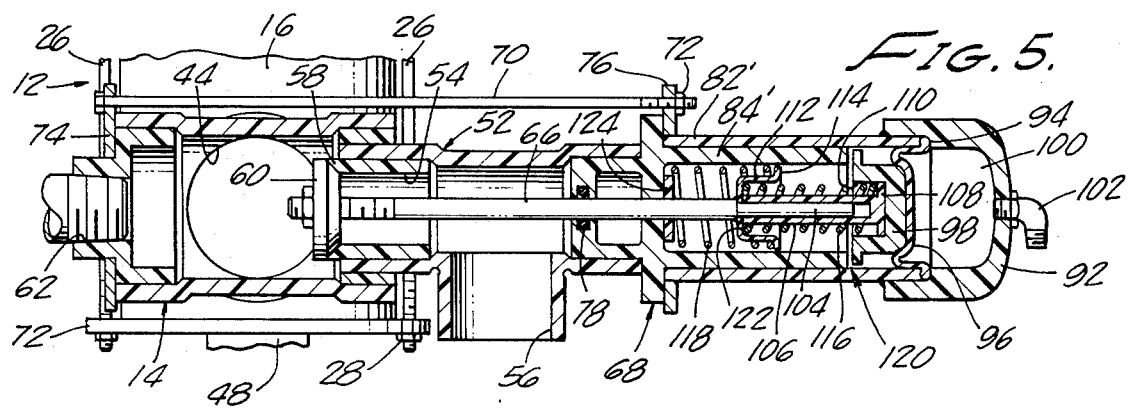
FIG. 5 is a view similar to that of FIG. 4, except that the actuator has been moved so as to compress the primary spring and closely approach a stop position where it will have established a direct connection with the valve, and initially unseat the valve as the actuator reaches its stop limit position.
Figure 6:
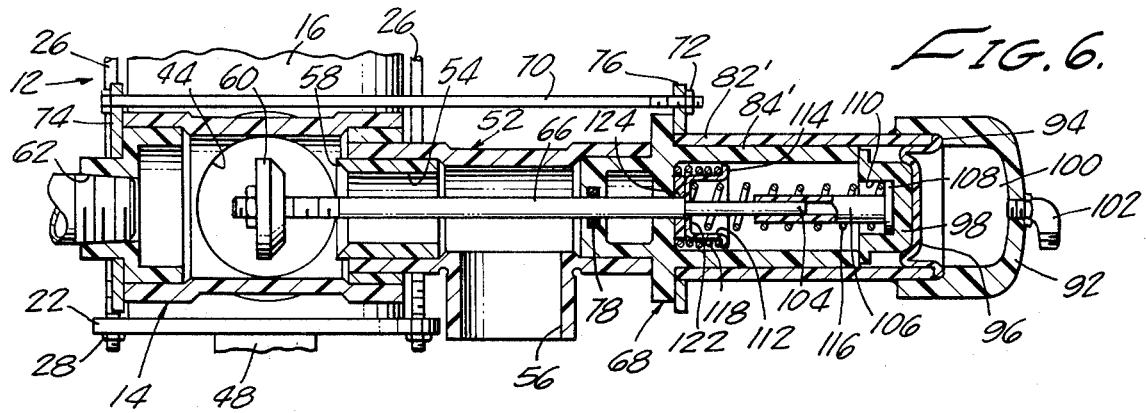
FIG. 6 is a view similar to FIG. 5, except that the actuator is shown in a position against its limit stop, and the previously compressed primary spring has operated to move the valve to a fully opened position.

FIGS. 4, 5, and 6 illustrate a modified form of the invention in which the poppet valve 60 is arranged to be actuated by means of a fluid pressure power actuator. In this embodiment, the annular flange 84 has been extended so as to form an elongate tubular projection 84'. The sleeve 82 is now formed as a non-slotted cylinder 82', and at its outermost end is provided with a closure cap 92 which is bonded or otherwise secured to the outermost end of the cylinder 82'. Internally, this cap is formed with a circumferentially extending radial shoulder 94 which coacts with the end edge of the cylinder 82' to grippingly engage the periphery of a flexible diaphragm 96 which supports a movable wall 98 at one side of a fluid pressure chamber 100 having communication with a fluid flow connection 102.

In this structure, the outermost end of the valve stem 66 is formed with an end section 104 of reduced diameter and has a telescoping sliding connection with a tubular stem extension section 106. The outermost end of section 106 is enlarged to form a head portion 108 which is seated within a recess 110 in the adjacent face of the movable wall 98. The stem 66, at its juncture with the end section 104, fixedly mounts a cup member 112 with its open side facing the movable wall 98 and having its rim outwardly deflected to form a circumferentially extending flange 114. As thus arranged, it will be appreciated that the stem sections 104 and 106 provide in effect a lost motion connection between the movable wall 98 and the valve member 60. The arrangement also includes a primary coiled compression spring 116 which is positioned around the telescoped sections with one end bearing against the head portion 108, and its other end seated in the cup member 112. A lighter secondary compression coil spring 118 is positioned on the opposite side of the cup member 112 in end-to-end axial alignment with the primary spring, the secondary spring having one end bearing against the flange 114, and its other end bearing against the adjacent face of the wall member 68. By reference to FIG. 4, it will be seen that the secondary spring operates normally, with the actuator deenergized, to urge the valve 60 to a seated position. The primary spring 116 at this time provides a resilient connection between the movable wall 98 and the valve 60.

Upon energizing the actuator by supplying a pressurized fluid to the pressure chamber 100, a sequence of valve opening steps will be effected. The fluid pressure in the chamber 100 will move the wall 98 in a direction to compress the primary spring 116, and this spring compressing action will continue until the movable wall reaches a position as shown in FIG. 5 in which it is slightly spaced, as indicated at 120, from the adjacent end of the tubular extension 84'. At this position, the innermost end of the tubular section 106 will engage a bottom 122 of the cup member 112 and form a direct connection between the movable wall 98 and the valve 60 so that the further movement of the wall 98 through the space 120 will operate to initially unseat the valve 60.

When the valve 60 is unseated, the fluid pressure force which is normally urging the valve to a closed position will be radically reduced to such an extent that the primary spring 116 will become effective to quickly move the valve 60 to a fully open position and thus provide the previously described explosive-like surge in the reversed backflow during the backwashing operation. The opening movement of the valve is limited by the abutment of the cup 112 against a spring centering washer 124 surrounding the stem 66 and in engagement with the wall member 68.

Figure 7:
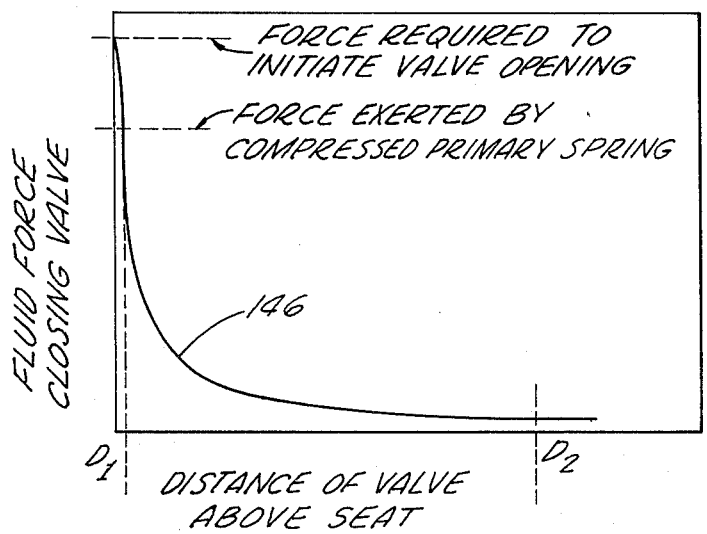
FIG. 7 is a curve which graphically illustrates the changes in pressure of a pressurized fluid acting to hold a poppet valve in seated position, as the valve is moved from a closed position to fully opened position.

In order to better understand the change which takes place in the fluid pressure force which retains the valve in closed position, and its relation to the primary spring force acting in a valve opening direction, reference is made to the typical curve 146 shown in FIG. 7. This curve represents the fluid force acting to close the valve, plotted against the distance of the valve above the valve seat. As will be seen from this curve, the fully compressed primary spring does not exert a sufficient force to open the poppet valve 60. The required force to initiate the valve opening is obtained from the fluid actuator, when the movable wall 98 is moved sufficiently to establish the direct connection between the movable wall and the valve 60. As soon as the valve is unseated a relatively small distance as indicated at $D_1$, the fluid pressure holding the valve in closed position drops radically at a rapid rate to an amount below the opening force which is being exerted by the compressed primary spring, and which operates to quickly activate the valve to a fully opened position as indicated at $D_2$.

From the foregoing description and drawings, it will be clearly evident that the delineated objects and features of the invention will be accomplished.

Various modifications may suggest themselves to those skilled in the art without departing from the spirit of the invention and, hence, it is not wished to be restricted to the specific forms shown or uses mentioned, except to the extent indicated in the appended claims.

I claim:

1. Filtering apparatus comprising, in combination:
   a. a filter having an inlet for a pressurized fluid to be filtered, and an outlet for the filtered fluid;
   b. control valves respectively for said filter inlet and said filter outlet;
   c. means providing a reversed flow backwash connection through the filter from a source of pressurized filtered fluid to a point of discharge, when said filter inlet and outlet control valves are closed; and
   d. a backwash poppet valve in said reversed flow connection normally urged by fluid presure to a closed position and having actuator means operable to effect a quick opening of the valve, whereby to produce an explosive surge in the backwash flow to dislodge accumulated filtered media in the filter.

2. Filtering apparatus according to claim 1, which includes a closed reservoir except for a bottom connection with the filter outlet ahead of said filter outlet control valve, whereby with the outlet valve closed and the inlet valve open, filtered fluid will be forced into said reservoir and compress the entrapped air therein, and upon closure of the filter inlet valve provide said source of pressurized filtered fluid.

3. Filtering apparatus according to claim 1, in which the filter comprises an upright cylindrical housing with top and bottom end walls respectively having a central opening, the bottom of said openings being in communication with the filter outlet; a filter member of tubular configuration in said housing with its ends respectively in sealed relation to said end walls and with an axial passage thereof having its ends respectively in communication with said central openings, and with its outer surrounding surface coacting to form with the adjacent wall of the housing an annular space having communication with the filter inlet; and in which a closed reservoir extends above said housing, said reservoir having an opening at its bottom end in direct communication with the central opening of said top end wall, whereby with the outlet valve closed and the inlet valve open, filtered fluid will be forced into said rservoir and compress the entrapped air therein, and upon closure of the filter inlet valve provide said source of pressurized filtered fluid for the backwashing operation.

4. Filtering apparatus according to claim 1, in which the actuator means of the backwash valve comprises a manually operable impacting member for applying an impact valve opening force to said valve.

5. Filtering apparatus according to claim 1, in which the actuator means of the backwash valve comprises a member movable in response to an applied pressurized fluid; means interconnecting said member and said backwash valve including a spring compressed in response to a predetermined initial movement of said member, and means operative at the end of said initial movement to establish a direct connection with said valve, whereby further movement of the member operates to initially unseat said valve, and permit the compressed spring to quickly move the valve to a fully open position.

6. A quick opening backwash valve in combination with a filter having an inlet and an outlet connectable for normal filtering flow of a pressurized fluid from said inlet to said outlet, and for reveresed backflow to clean the filter, said valve comprising:
   a. a valve body having a flow port adapted for connection with the filter inlet, and a discharge port, and said ports being connected by a flow passage in said body;
   b. an annular valve seat in said body flow passage between said ports;
   c. a poppet valve on the flow port side of said valve seat adapted to be normally urged by the pressurized fluid into a closed seated position opposing reversed backflow through the filter; and
   d. means for applying an actuating force to quickly unseat said valve, whereby the backflow will be released for flow through said discharge port with an explosive-like surge so as to more effectively dislodge and remove the filtered out media.

7. A quick opening valve according to claim 6, including an inlet port in the valve body for supplying pressurized fluid to the flow passage portion having connection with said flow port.

8. A quick opening valve according to claim 6, wherein the valve actuating force is an impact force.

9. A quick opening valve according to claim 6, wherein the valve is carried by a stem which extends through said annular seat and is supported for reciprocable movements, said stem having an outer end portion extending to the exterior of said body and being sealed with respect to said body passage; and in which the force applying means comprises an impacting member supported on said body for guided movement from a position spaced from the stem outer end portion and a position of engagement with said outer end portion.

10. A quick opening valve according to claim 9, in which the stem outer end portion is formed to provide an impact receiving head portion.

11. A quick opening valve according to claim 10, wherein the head portion is of an elastomeric material.

12. A quick opening valve according to claim 10, wherein the head portion is engageable with an abutment stop for limiting the extent of opening of said valve.

13. A quick opening valve according to claim 9, in which the impacting member is supported within a tubular member surrounding the outer end portion of said stem, said guide member being attached to said valve body; and a handle member extending from said impacting member, said handle extending through and being movable in a guide slot formed in said guide member, whereby said impacting member may be manually actuated.

14. A quick opening valve, comprising:
a. a valvebody having an inlet port and an outlet port interconnected by a flow passage;
b. valving means in said passage including a valve member and operatively associated valve set;
c. another port in communication with said inlet port and the connecting portion of said flow passage;
d. a valve stem having an outer end portion positioned exteriorly of said valve body;
e. valve actuating means for applying an impact opening force to the valve, comprising:
an impacting member;
means supporting said impacting member adjacent the outer end portion of said valve stem for movement to engaged and disengaged positions with respect to the outer end portion of said stem; and
handle means carried by said impacting member enabling manual movement thereof to said engaged and disengaged positions.

15. A quick opening valve according to claim 6, wherein the means for applying the actuating force comprises fluid actuated motor means.

16. A quick opening valve according to claim 15, in which the motor means comprises: a fluid pressure chamber having a wall movable in one direction under said chamber pressure; connecting means between said wall and said valve including a spring adapted to be compressed in response to movement of said wall; said connecting means being further operative in response to a predetermined movement of said wall to unseat said valve, whereupon fluid pressure normally urging the valve towards its seated position will be overcome by the force of said compressed spring, and whereby said valve will be quickly moved by the spring force to a fully opened position.

17. A quick opening valve according to claim 16, in which said connecting means includes lost motion means for establishing a direct acting connection between side wall and said valve in response to the predetermined movement of said wall.

18. A quick opening valve according to claim 16, wherein said spring comprises a primary spring; and which includes a weaker secondary spring for moving said valve towards a seated position.

19. A quick opening valve according to claim 18, in which the primary and secondary springs are in end-to-end relation.

20. A quick opening valve according to claim 16, in which the connecting means includes valve stem means having telescoping sections, one of said sections being secured to said valve and the other of said sections being secured to said wall, and in which the extent of movement of the sections towards each other is determined by abutment engagement of portions of said sections.

21. A quick acting valve according to claim 20, in which said spring comprises a primary spring surrounding telescoped adjacent ends of said sections, one end of said primary spring being connected with the section secured to said wall and the other end being connected with the section secured to said valve.

22. A quick acting valve according to claim 21, in which a secondary spring surrounds the adjacent end of the section secured to said valve and has one end connected to such section and the other end connected with an adjacent portion of the valve body.

23. A quick acting valve according to claim 16, in which said predetermined movement of said wall is limited by abutment means carried by said valve body.

24. A quick opening valve, comprising:
a. a valve body having an inlet port and an outlet port interconnected by a flow passage;
b. valving means in said passage including a poppet valve member adapted to be normally urged to a closed position against an associated valve seat by an inlet pressurized fluid;
c. a valve actuator having a fluid pressure chamber containing a wall movable in one direction under said chamber pressure;
d. means interconnecting said wall and said valve including a compression spring having one end connected with said wall and the other end connected with said valve;
e. said connecting means being operable to compress said spring in in response to said wall movement and initiate an opening movement of said valve, and whereupon the fluid pressure urging the valve towards the seat will be overcome by the force of the compressed spring to quickly fully open the valve.

25. A quick opening valve according to claim 24, in which said valve and said wall are interconnected by stem means comprising a valve connected stem section and a wall connected stem section, said sections having adjacently disposed ends in telescopic relation; in which said spring has one end connected with said wall section and its other end connected with said valve section; and in which said sections, after a predetermined spring compressing movement of said wall, coact to establish a direct valve opening connection between said wall and said valve.

* * * * *